Patented Sept. 21, 1943

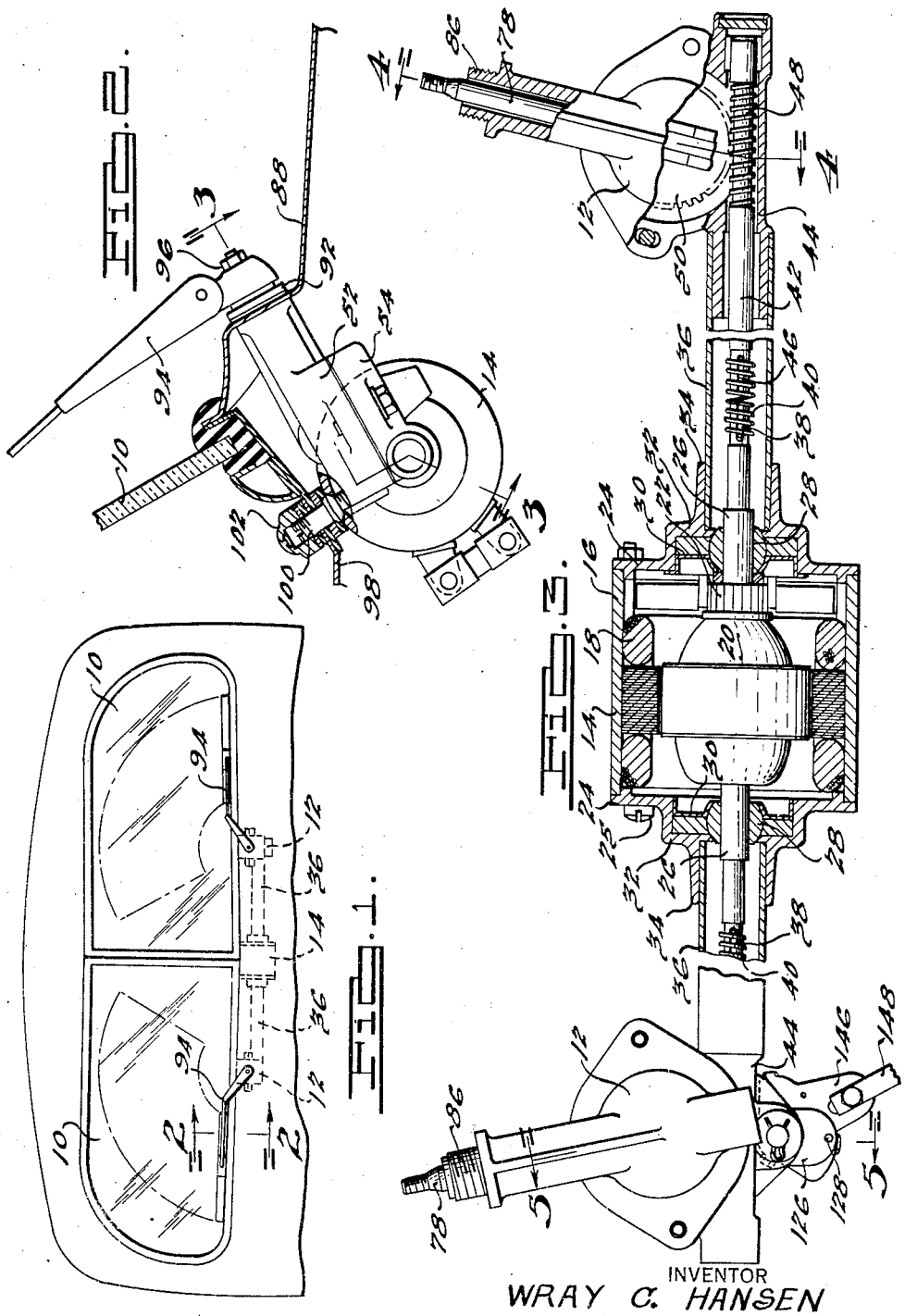

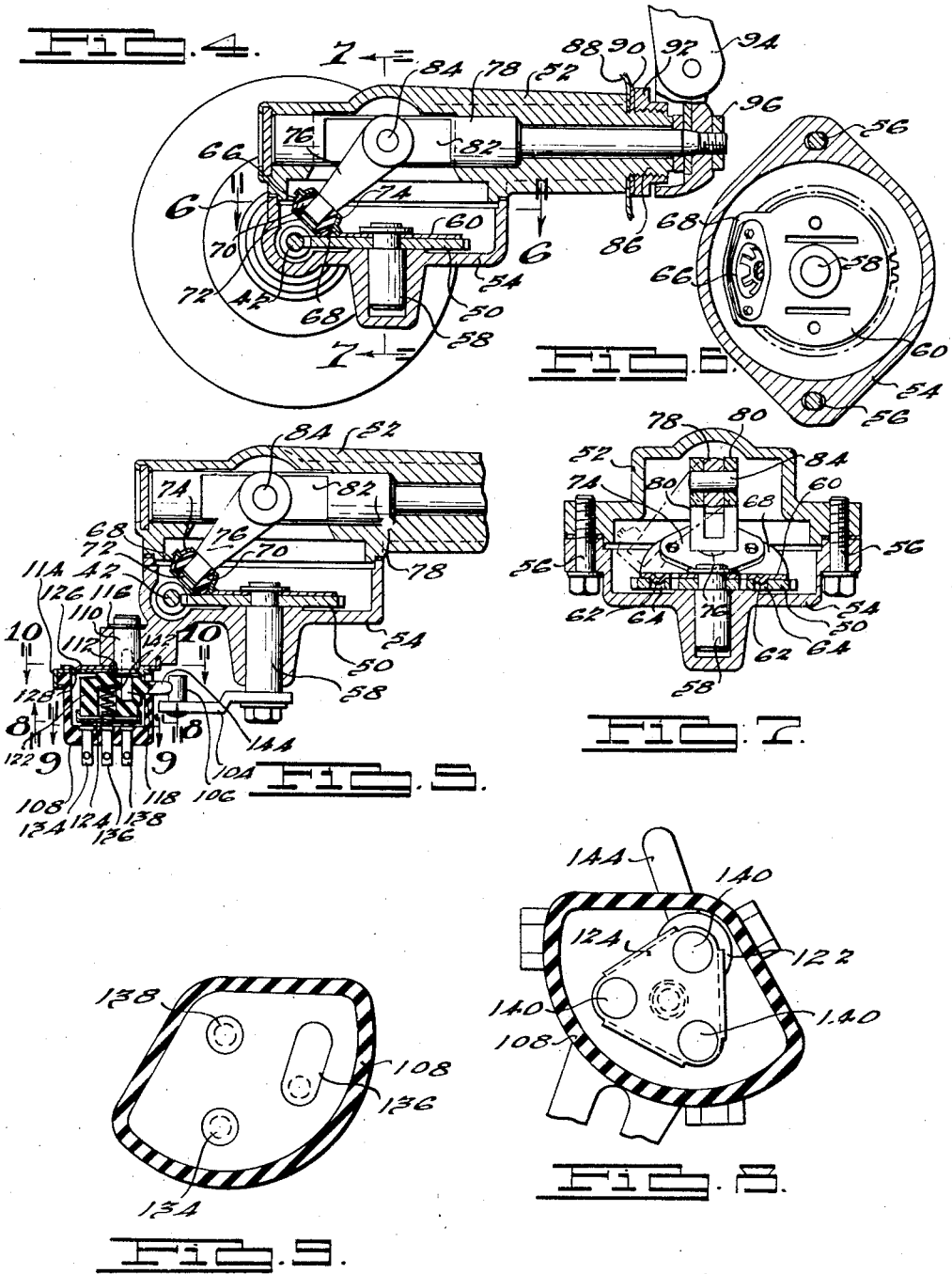

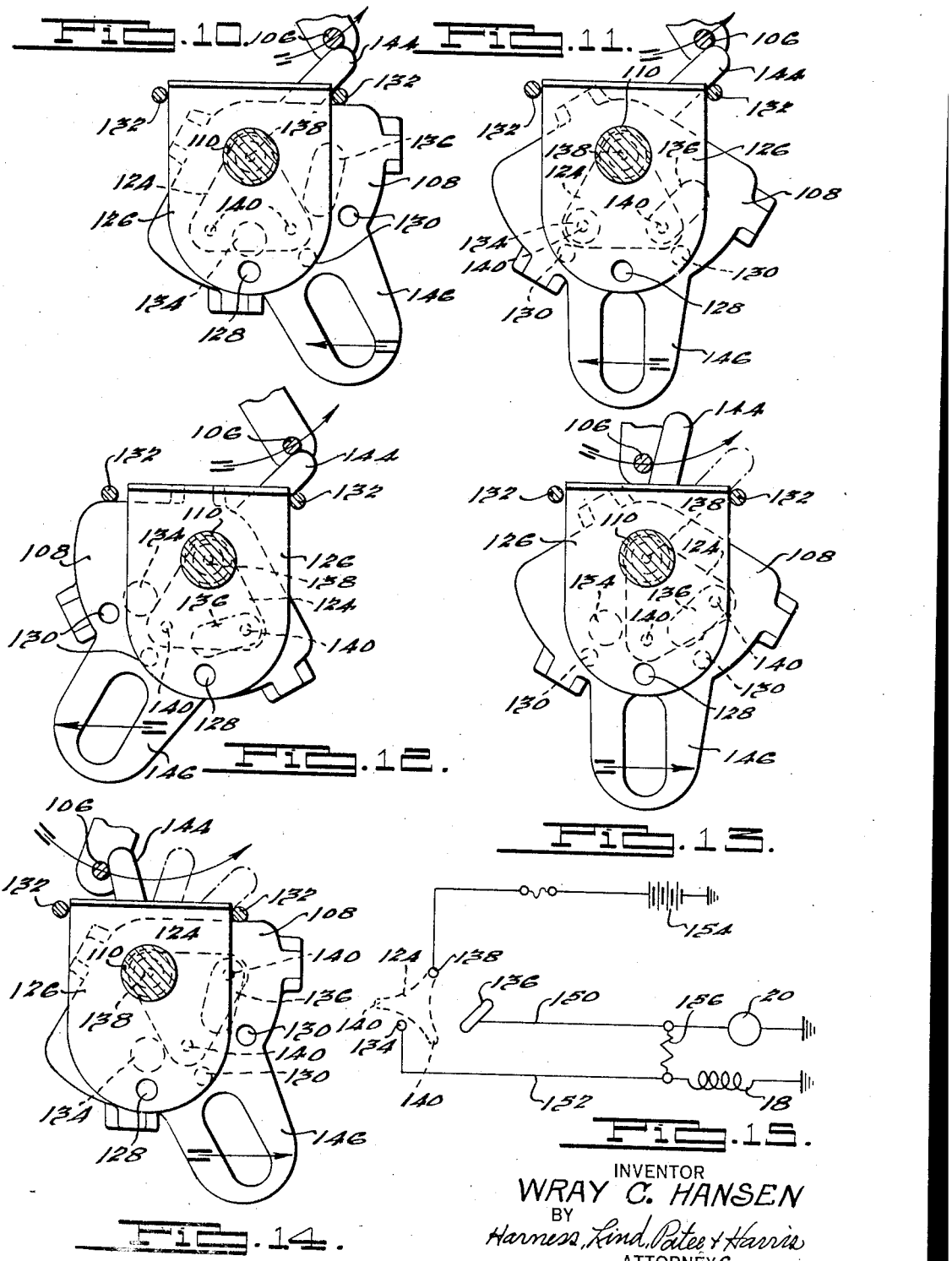

2,329,895

UNITED STATES PATENT OFFICE 2,329,895

WINDSHIELD WIPER MECHANISM

Wray C. Hansen, Highland Park, Mich., assignor to Chrysler Corporation, Highland Park, Mich., a corporation of Delaware Application May 11, 1940, Serial No. 334,522

2 Claims. (Cl. 15—253)

This invention relates to an improved windshield wiper mechanism and particularly to a mechanism for actuating a pair of windshield wiper blades each of which operates upon one of a pair of relatively angularly disposed sections of a V-shaped windshield.

An important object of the invention is to provide improved operating mechanism which may be conveniently accommodated between the dash and instrument panel of a motor vehicle in the vicinity of the converging edges of the sections of a V-shaped windshield.

Another object of the invention is to provide a driving element which is adapted to drive a pair of spaced mechanisms which operate respectively in a pair of converging planes substantially parallel to the planes of the windshield sections.

A further object of the invention is to provide an improved driven mechanism for the respective wiper blades whereby a rotary movement is transferred to an oscillatory movement.

A further object of the invention is to provide an improved switch mechanism for regulating the driving mechanism for the wiper blades.

Other objects and advantages of the invention will be more fully understood from the following description taken in connection with the accompanying drawings in which:

Fig. 1 is a fragmentary, front elevational view of an automobile showing the positions of the various parts of the windshield wiper mechanism.

Fig. 2 is a sectional view taken on line 2—2 of Fig. 1 showing the windshield wiper mechanism in elevation.

Fig. 3 is a longitudinal sectional view taken on line 3—3 of Fig. 2 showing the windshield wiper driving mechanism, parts being broken away and parts shown in elevation.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 4.

Fig. 7 is a sectional view taken on line 7—7 of Fig. 4.

Fig. 8 is a sectional view taken on line 8—8 of Fig. 5.

Fig. 9 is an enlarged sectional view taken on line 9—9 of Fig. 5.

Figs. 10 to 14, inclusive, are enlarged views of the switch mechanism taken on line 10—10 of Fig. 5.

The figures illustrate respectively the several positions of the switch mechanism.

Fig. 15 is a wiring diagram showing the electric circuit.

Referring to the drawings, the upper front end of an automobile is shown in Fig. 1 having a pair of angularly disposed windshield sections 10. Mounted on the cowl and beneath the windshield 1 have located a unitary structure including a pair of windshield wiper mechanisms 12, and a motor 14 for driving the two mechanisms. The motor 14 comprises an annular housing 16 enclosing a field 18, armature 20, commutator 22 and detachable end walls 24 which are held in assembled position by bolts 25. The armature shaft 26 is extended from opposite sides and is journaled in the end walls 24. The bearings 28 have their outer periphery formed spherical and are supported in the end walls by disks 30 which are pressed into hubs 32 in the ends walls 24.

The hubs 32 are each provided with an annular flange 34 which receive tubular members 36 surrounding the shaft 26. The ends of the shaft 26 are slotted as shown at 38 to receive one end of a spring 40. A shaft 42, in axial alignment with the shaft 26 is journaled in a housing 44 of the wiper driving mechanisms. The shaft has its end slotted as shown at 46 to receive the opposite end of the spring 40. The spring 40 forms a drive between the two shafts 26 and 42. The opposite end of the shaft 42 is provided with a worm thread 48 in driving engagement with a gear 50 journaled in the housing 44 of the wiper driving mechanisms 12. The two driving mechanisms 12 are identical and only the one will be described which is shown in detail in Figs. 4 to 7, inclusive.

The housing 44 is made in two pieces, an upper section 52 and a lower section 54 which are secured together by screws 56. The lower section 54 carries a shaft 58 which is journaled therein and which carries the gear 50 rotatable therewith. The gear 50 carries a stamped disk 60 which has depressed portions 62 received in openings 64 to form a drive connection between the disk 60 and gear 50. At one side of the disk 60 there is provided a socket 66 formed in a diagonally extending flange 68. A bearing member 70 having an opening 72 is received in the socket 66 and is held in place by a removable cover 74.

The opening 72 in the bearing 70 receives the end of an arm 76 which is pivotally supported on a shaft 78 journaled in the upper housing section 52. The arm 76 is bifurcated as shown in Fig. 7 and the two arms 80 thereof extend on opposite sides of the shaft 78, the latter being flattened at 82 as shown in Figs. 4 and 5. A pin 84 pivotally supports the arm 76 on the shaft 78.

The upper housing section has a reduced and threaded end 86 which extends through the cowl 88. A washer 90 and nut 92 are received on the end 86 and hold the mechanism in position. The shaft 78 is extended through the threaded end 86 and receives the usual wiper blade 94 which is held in position on the outer end of the shaft 78 by a nut 96.

The motor 14 is secured to the body flange 98 by a stud 17 carried by the motor housing 16 and a nut 102 secures the latter in position. By this arrangement the completely assembled unit is secured in position at three points, through the motor at the center and through the opposite ends.

A switch mechanism may be applied to either driving mechanism 12 and is shown in Fig. 5. The shaft 58 is extended through the housing 54 and receives an arm 104 which has a pin 106. This arm and pin are rotatable with the shaft 58 and gear 50. The switch housing 108 is rotatably supported on a pin 110 carried by the housing 54. The pin 110 is riveted on at 112 to a cover plate 114 secured to the housing 108 and is held in the housing 54 by a C washer 116 fitting a groove in the pin 110. Another pin 118 fitting an opening in the pin 110 pivotally supports an insulation member 122 which carries a contact plate 124. A stationary spring plate 126 has a detent 128 fitting one of the three openings 130 in the cover plate 114 to retain the switch in one of three positions. Pins 132 carried by the housing 54 limit the extreme positions of the switch housing. Three contact terminals 134, 136, and 138 are provided in the housing 108 for selective contact with projections 140 on the contact plate 124. A spring 142 urges the contact plate 124 into contact with the bottom face of the housing 108.

The insulation member 122 is provided with an arm 144 adapted to be positioned in the path of the rotatable arm 104 and pin 106. It is to be understood that the switch housing 108 is rotatable on the pin 110 and movable to one of three positions, off, low speed and high speed. The insulation member 122 carrying the contact plate 124 is also rotatable with and relative to the rotatable housing 108.

Referring now to the operation of the device it will be assumed that the wiper blades are in the position shown in Fig. 1 and the electric motor 14 is off. The switch housing 108 and contact plate 124 are in the position shown in Fig. 10. To start the motor on low speed the switch housing 108 is moved clockwise to a position shown in Fig. 11. The arm 144 is held by the pin 132 so that the switch housing 108 moves relative to the contact plate 124. The latter constantly in contact with terminal 138, then makes contact with the terminals 134 and 136 so that the current flows directly to the armature 20 and the field 18 through wires 150 and 152 from a source of electrical energy such as a battery illustrated at 154. The motor 14 is of the ordinary shunt type having a shunt field resistance 156. Weakening the field increases the speed of the motor so that if the current does not flow directly to the field 18 through the terminal 134 and wire 152 but is directed through wire 150 and resistance 156 the field is weakened and the speed of the motor increased.

To drive the wipers at a higher speed the switch housing 108 is moved clockwise to a position shown in Fig. 12. The contact plate 124 then contacts only the terminal 136. To shut the wiper off or to turn it back to the lower speed the switch housing is turned in a counterclockwise direction. If the low speed is desired the switch is turned to a position shown in Fig. 13 and if for shut-off, to a position shown in Fig. 14. When the switch housing 126 is turned in a counterclockwise direction the contact plate 134 and arm 144 are turned with the switch as indicated in Figs. 13 and 14 and the rotating pin 106 then moves the contact plate 124 back to its position shown in Figs. 10, 11 and 12. The slotted arm 146 receives a control connection 148 for moving the switch housing 108.

When the switch housing is turned from one speed to another or to the off position, the switch does not set itself to that position until the pin 106 moves the arm 144. This assures the shutting off of the motor at the proper time when the wiper blades are in the down position as shown in Fig. 1. The arm 104 is adjustable on the shaft 58 so that it may be positioned with the pin 106 in contact with the arm 144 for shut off when the arm 76 is in a position shown by dotted lines in Fig. 7. The reason for this being that for several degrees of rotation of the gear 50 there will be practically no movement of the shaft 78 when the arm 76 is in that position or a position diametrically opposite. This provides an ideal construction for positioning the wiper blades in their down position when the motor is shut off. The wiper blades 94 are oscillating fastest when the arm 76 is in the position shown in Fig. 7.

All parts with the exception of the blades 94 can be bench assembled and the assembled parts tested before an installation is made on the vehicle.

Various changes including the size, shape and arrangement of parts may be made without departing from the spirit of my invention and it is not my intention to limit its scope other than by the terms of the appended claims.

I claim:

1. A motor driven windshield wiper comprising an electrical switch for said motor having a movable part adapted for movement to one of three positions, a relatively movable contact member cooperating with said part, means for manually moving said part independently of said contact member, and means for moving said contact member independently of said part.

2. In a windshield wiper mechanism, the combination of a unitary structure including an electric motor, a wiper blade and driving connections therebetween, and a two speed switch for said motor comprising a manually movable housing, contact members carried by said housing, a movable contact member movable with said housing for engagement with said first named contact members, and a rotatable member carried by said windshield wiper mechanism for moving said movable contact member relative to said housing.

WRAY C. HANSEN.